(12) United States Patent
Maciocci et al.

(10) Patent No.: US 8,615,772 B2
(45) Date of Patent: Dec. 24, 2013

(54) APPARATUS AND METHODS OF EXTENDING APPLICATION SERVICES

(75) Inventors: Giuliano Maciocci, Duxford (GB); Paul Mabbutt, Peterborough (GB)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/216,006

(22) Filed: Aug. 23, 2011

(65) Prior Publication Data
US 2012/0079504 A1  Mar. 29, 2012

Related U.S. Application Data

(60) Provisional application No. 61/387,451, filed on Sep. 28, 2010.

(51) Int. Cl.
*G06F 13/00* (2006.01)
(52) U.S. Cl.
USPC .......................................... 719/313
(58) Field of Classification Search
None
See application file for complete search history.

(56) References Cited

U.S. PATENT DOCUMENTS

| | | | |
|---|---|---|---|
| 6,008,809 A | 12/1999 | Brooks | |
| 6,297,823 B1 | 10/2001 | Bharali et al. | |
| 6,317,143 B1 | 11/2001 | Wugofski | |
| 7,370,284 B2 | 5/2008 | Andrea et al. | |
| 7,640,546 B2 * | 12/2009 | Zarenin et al. | 718/102 |
| 2004/0059776 A1 * | 3/2004 | Pitzel et al. | 709/203 |
| 2005/0246726 A1 * | 11/2005 | Labrou et al. | 719/328 |
| 2008/0148149 A1 | 6/2008 | Singh et al. | |
| 2008/0183710 A1 * | 7/2008 | Serjeantson et al. | 707/8 |
| 2009/0222842 A1 | 9/2009 | Narayanan et al. | |
| 2010/0058353 A1 * | 3/2010 | Turski | 719/311 |
| 2010/0191604 A1 | 7/2010 | Raleigh | |
| 2010/0211960 A1 * | 8/2010 | Sirajuddin et al. | 719/313 |

OTHER PUBLICATIONS

International Search Report and Written Opinion—PCT/US2011/053428—ISA/EPO —Mar. 19, 2012.

* cited by examiner

*Primary Examiner* — Gregory A Kessler
(74) *Attorney, Agent, or Firm* — Fariba Yadegar-Bandari

(57) ABSTRACT

Apparatus and methods for extending services of a user device include identifying a first application resident on a user device having a first service that utilizes a first data type. Further, the apparatus and methods include identifying a second application of a plurality of applications having a second service that utilizes a second data type. Additionally, the apparatus and methods include matching a compatibility of a selected one of the first service or the first data type of the first application with a respective one of the second service or the second data type of the second application.

31 Claims, 16 Drawing Sheets

APPARATUS AND METHODS OF EXTENDING APPLICATION SERVICES

CLAIM OF PRIORITY UNDER 35 U.S.C. §119

The present application for patent claims priority to Provisional Application No. 61/387,451 entitled "FRAMEWORK FOR THIRD PARTY EXTENSION OF CORE APPLICATION USER INTERFACES" filed Sep. 28, 2010, and assigned to the assignee hereof and hereby expressly incorporated by reference herein.

BACKGROUND

The present disclosure relates to a mobile operating environment, and more particularly, to providing improved apparatus and methods of distributing integrated mobile applications for user devices.

Mobile operators or mobile device carriers play a major part in the telecommunication industry today. Initially, mobile operators concentrated their efforts on generating revenue by increasing their subscriber base. However, it will be appreciated that in several countries, the scope for increasing the subscriber base has now become very limited, as the market has reached close to the saturation point. As a result, the mobile operators have been branching into providing value added services to subscribers in order to increase their revenue.

One way of generating increased revenue is through the sales of premium services, such as ringtones, wallpaper, games, etc., to users. These services may be provided by the mobile operator themselves, or by business entities who may operate in collaboration with the mobile operators to provide such services. The services may be available for download to a mobile device or user equipment upon payment of a fee.

Many benefits, such as maximizing the potential earnings for sales, accrue upon recommending and promoting to users content or services that are the most likely to be of interest to the users. The users can have a better experience using their mobile device in light of these individually recommended content and services.

A burgeoning area of such content and services pertains to applications. For example, an on-device mobile application store has become a crowded, hard-to-browse experience as more and more applications come online. Similarly, given the general user interface limitations of most mobile computing platforms, applications that are installed can have functionality that can only be used one at a time. Each application generally runs standalone. Conventionally, mobile platforms in some instances allow for the sharing of data (e.g., contact details) across the mobile platform. That functionality does not extend, however, to the sharing of full, custom user interface (UI) extensions between third party and core applications.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In one aspect, the present disclosure provides a method for extending services of a user device. The method includes identifying a first application resident on a user device having a first service that utilizes a first data type. The method further includes identifying a second application of a plurality of applications having a second service that utilizes a second data type. The method further includes matching a compatibility of a selected one of the first service or the first data type of the first application with a respective one of the second service or the second data type of the second application.

In another aspect, the present disclosure provides at least one processor for extending services of a user device. A first module identifies a first application resident on a user device having a first service that utilizes a first data type. A second module identifies a second application of a plurality of applications having a second service that utilizes a second data type. A third module matches a compatibility of a selected one of the first service or the first data type of the first application with a respective one of the second service or the second data type of the second application.

In an additional aspect, the present disclosure provides a computer program product for extending services of a user device. A non-transitory computer-readable storage medium stores instructions. At least one instruction causes a computer to identify a first application resident on a user device having a first service that utilizes a first data type. At least one instruction causes the computer to identify a second application of a plurality of applications having a second service that utilizes a second data type. At least one instruction causes the computer to match a compatibility of a selected one of the first service or the first data type of the first application with a respective one of the second service or the second data type of the second application.

In a further aspect, the present disclosure provides an apparatus for extending services of a user device. The apparatus comprises means for identifying a first application resident on a user device having a first service that utilizes a first data type. The apparatus comprises means for identifying a second application of a plurality of applications having a second service that utilizes a second data type. The apparatus comprises means for matching a compatibility of a selected one of the first service or the first data type of the first application with a respective one of the second service or the second data type of the second application.

In yet another aspect, the present disclosure provides an apparatus for extending services of a user device. An extension manager identifies a first application resident on a user device having a first service that utilizes a first data type. A discovery agent identifies a second application of a plurality of applications having a second service that utilizes a second data type. The discovery agent identifies the second application by matching a compatibility of a selected one of the first service or the first data type of the first application with a respective one of the second service or the second data type of the second application.

To the accomplishment of the foregoing and related ends, the one or more aspects comprise the features hereinafter described in more detail and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

Current mobile devices are limited in the way core mobile applications, such as contacts, calendars, maps, photos etc., can be extended. While some mobile operating systems allow for third party downloadable applications to share some of their data, the same does not apply to their user interfaces. Additionally, the current standard model of a virtual application store from which mobile applications can be downloaded provides a single point of entry for application discovery (usually an application store icon on a home screen of a mobile device).

The present disclosure provides a mobile platform User Interface (UI) that can be structured to provide a mechanism for an application, such as one or more third party applications, to provide UI and data extensions into one or more other applications, such as core applications, stored on a mobile device. As used herein, a core application includes any application preconfigured on a mobile device, while a third party application includes any application that is not a core application, although the principles described herein relate to extending any application based on functionality of another application. Further, the provided UI and data extensions refer to additional services that can be added to one application based on another application. As used herein, the term service includes any application-related functionality. In some aspects, the extension of a service is based on one application utilizing a service or data type that is compatible with another application, where data type relates to a type or format of data used by the application. The present disclosure further provides multiple, contextual points of access for discovering and downloading of one or more applications, such as third party applications, from inside the UI of one or more other applications, such as core mobile applications, thereby allowing users to easily discover and download one or more new applications which functionality extends any resident application.

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

Figure 1:
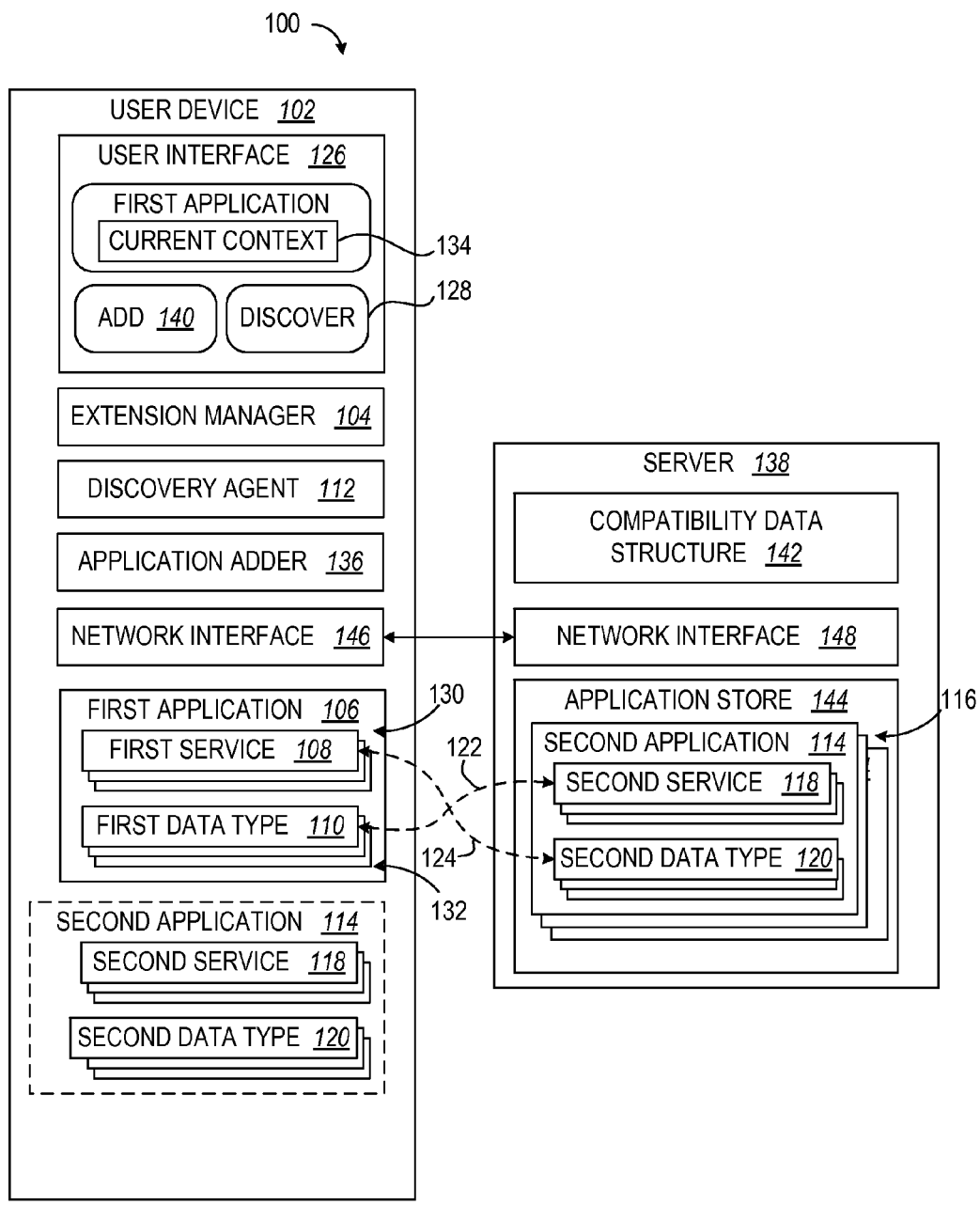
FIG. 1 illustrates a schematic diagram for an apparatus for extending services of a user device, according to one aspect.

In FIG. 1, the present disclosure provides an apparatus 100 for extending services of a user device 102, according to one aspect. An extension manager 104 identifies a first application 106 resident on the user device 102 having a first service 108 that utilizes a first data type 110. A discovery agent 112 identifies a second application 114, for example from a plurality of applications 116, having a second service 118 that utilizes a second data type 120. The discovery agent 112 identifies the second application 114 by matching a compatibility of a selected one of the first service 108 or the first data type 110 of the first application 106 with a respective one of the second service 118 or the second data type 120 of the second application 114.

For example, the discovery agent 112 can match a compatibility of the first service 108 of the first application 106 with the second data type 120 of the second application 114 as depicted at 122. For example, the first service 108 may include a contact service and the second data type 120 may include an online gamer contact. In another example, the first service 108 may include a contact service and the second data type 120 may include a location service.

Alternatively or in addition, the discovery agent 112 can match a compatibility of the first data type 110 of the first application 106 with the second service 118 of the second application 114 as depicted at 124. For example, the first data type 110 may include a media format and the second service 118 may include a media viewer. In another example, the first data type 110 may includes a media format and the second service 118 may include an uploader to a server. As an additional example, the first data type 110 may include an image format associated with at least one location and the second service 118 may include a service associated with the at least one location.

A user interface 126 presents the first application 106 with a representation, depicted as a discovery icon 128, of the discovery agent 112, which may be selected, e.g. based on user input, for activating the identifying of compatible applications, such as the second application 114.

In one aspect, the first application 106 may include at least one of a plurality of services 130 or a plurality of data types 132. The user interface 126 can present a current context 134 that identifies the first service 108 and the first data type 110.

Accordingly, rather than consider all of the plurality of services 130 or the plurality of data types 132, in an aspect the discovery agent 112 may identify the current context 134 and then may identify the second application 114 according to the current context 134.

In one aspect, an application adder 136 manages the acquisition and storage of the second application 114 on the user device 102, for example from a server 138. In an exemplary aspect, the user interface 126 presents the first application 106 with a representation, depicted as a download or "add" icon 140, of the application adder 136 for activating or initiating the acquisition and storage, e.g. downloading, of the second application 114.

In one aspect, a data structure 142 may define one or more of the compatibilities of the plurality of applications 116. For example, data structure 142 may identify service types and/or data types of a respective application, compatible service types and/or data types that work with a respective application, and/or other applications that are compatible with a respective application. The discovery agent 112 may access the data structure 142 for use in determining matching of the compatibility of the first application 106 with one or more of the plurality of applications 116, such as for matching with the second application 114 as discussed above. For example, the data structure 142 can be resident on the user device 102 for all of the plurality of applications 116. Alternatively, the data structure 142 can be resident on the user device 102 for a subset of the plurality of applications 116 that are resident or stored on the user device 102. Alternatively or in addition, the data structure 142 can be resident on the server 138 for all of the plurality of applications 116, and linked to an application store 144 for downloading to one or more user devices, such as user device 102. In an aspect, for example, the user device 102 can access the data structure 142 via a network interface 146 on user device 102 that is capable of communication with a network interface 148 of the server 138.

Thus, in one aspect, the extension manager 104 obtains and integrates the respective one of the second data type 120 or second service 118 of the second application 114 for use by the selected one of the first service 108 or the first data type 110 of the first application 106 in response to a user selection.

Figure 2:
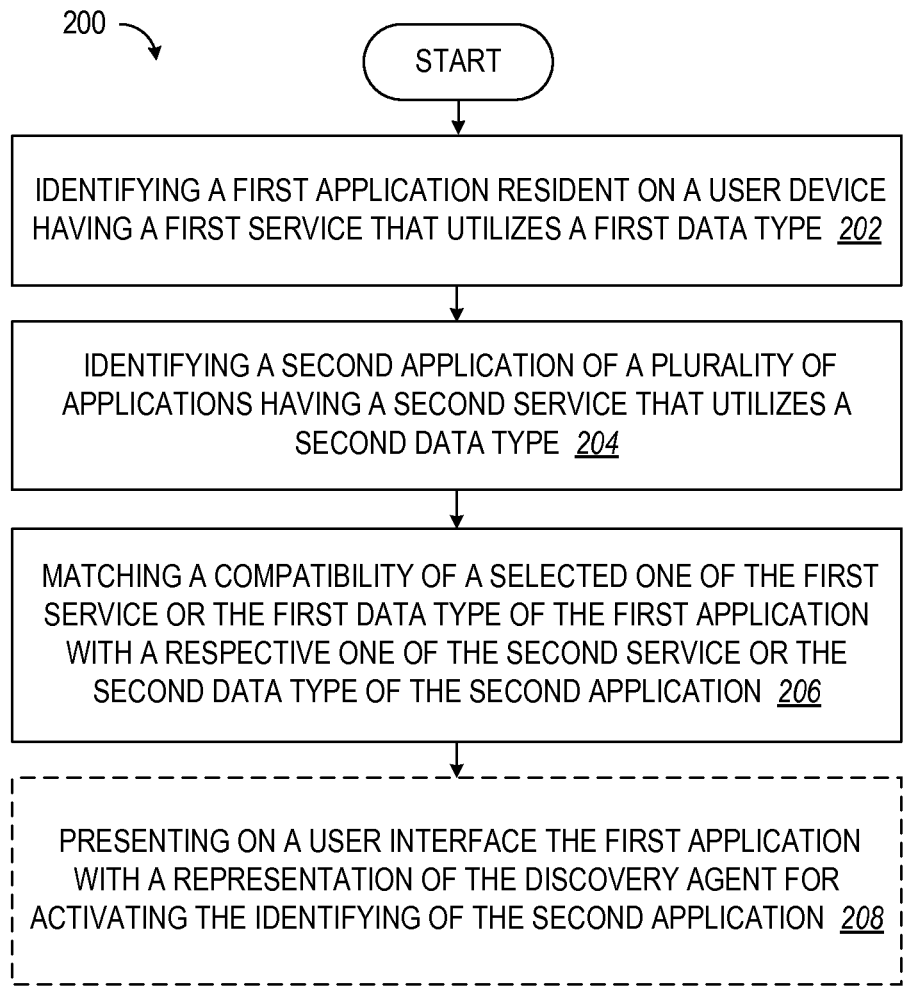
FIG. 2 illustrates a flow diagram of a methodology for extending services of a user device, according to one aspect.

In FIG. 2, in one aspect, a method 200 for extending services of a user device includes identifying a first application resident on a user device which has a first service that utilizes a first data type (block 202). For example, the extension manager 104 identifies the first application 106 on the user device 102 having the first service 108 that utilizes the first data type 110 (FIG. 1). The method 200 further includes identifying a second application of a plurality of applications having a second service that utilizes a second data type (block 204). For example, the discovery agent 112 identifies the second application 114 of the plurality of applications 116 having the second service 118 that utilizes the second data type 120 (FIG. 1). The method 200 further includes matching a compatibility of a selected one of the first service or the first data type of the first application with a respective one of the second service type or the second data type of the second application (block 206). For example, the discovery agent 112 identifies the second application 114 by matching a compatibility of the selected one of the first service 108 or the first data type 110 of the first application 106 with the respective one of the second data type 120 or second service 118 of the second application 114 (FIG. 1). Optionally, in an exemplary aspect, the method 200 further includes presenting the first application with a representation of the discovery agent for activating the identifying of the second application (block 208). For example, the user interface 126 presents the first application 106 with the representation, depicted as the discovery icon 128, of the discovery agent 112 for activating the identifying of the second application 114 (FIG. 1).

In one aspect, the first application 106 may include at least one of a plurality of services or a plurality of data types. In this case, the method 200 can further include identifying a current context defined by the first service and the first data type, and identifying the second application according to the current context.

In one aspect, the method 200 can further include acquiring and storing the second application on the user device, e.g. by downloading from a server. In an exemplary aspect, the method 200 may further include presenting on a user interface the first application with a representation of the application adder for activating the acquisition and storage of the second application in the user device.

In one aspect, the method 200 of matching a compatibility (block 206) may identify a match between the first service of the first application and the second data type of the second application. For example, the first service may include a contact service and the second data type comprises an online gamer contact. For another example, the first service may include a contact service and the second data type comprises a location service.

In one aspect, the method 200 of matching a compatibility (block 206) may identify a match between the first data type of the first application and the second service of the second application. For example, the first data type may include a media format and the second service comprises a media viewer. For another example, the first data type may include a media format and the second service comprises an uploader to a server. For another example, the first data type may include an image format associated with at least one location and the second service comprises a service associated with the at least one location.

In one aspect, the method 200 may include obtaining a data structure that defines one or more of the compatibilities of the plurality of applications. For example, in an aspect, the data structure may be obtained by accessing the data structure via a network interface.

In one aspect, the method 200 may include obtaining and integrating the respective one of the second data type or second service of the second application for use by the selected one of the first service or the first data type of the first application in response to a user selection.

As examples of use, in FIGS. 3-10 and 11A-11B, an exemplary mobile device 300 presents a graphical user interface (GUI) 302 for interacting with a UI application integrator according to one aspect consistent with the present disclosure.

Figure 3:
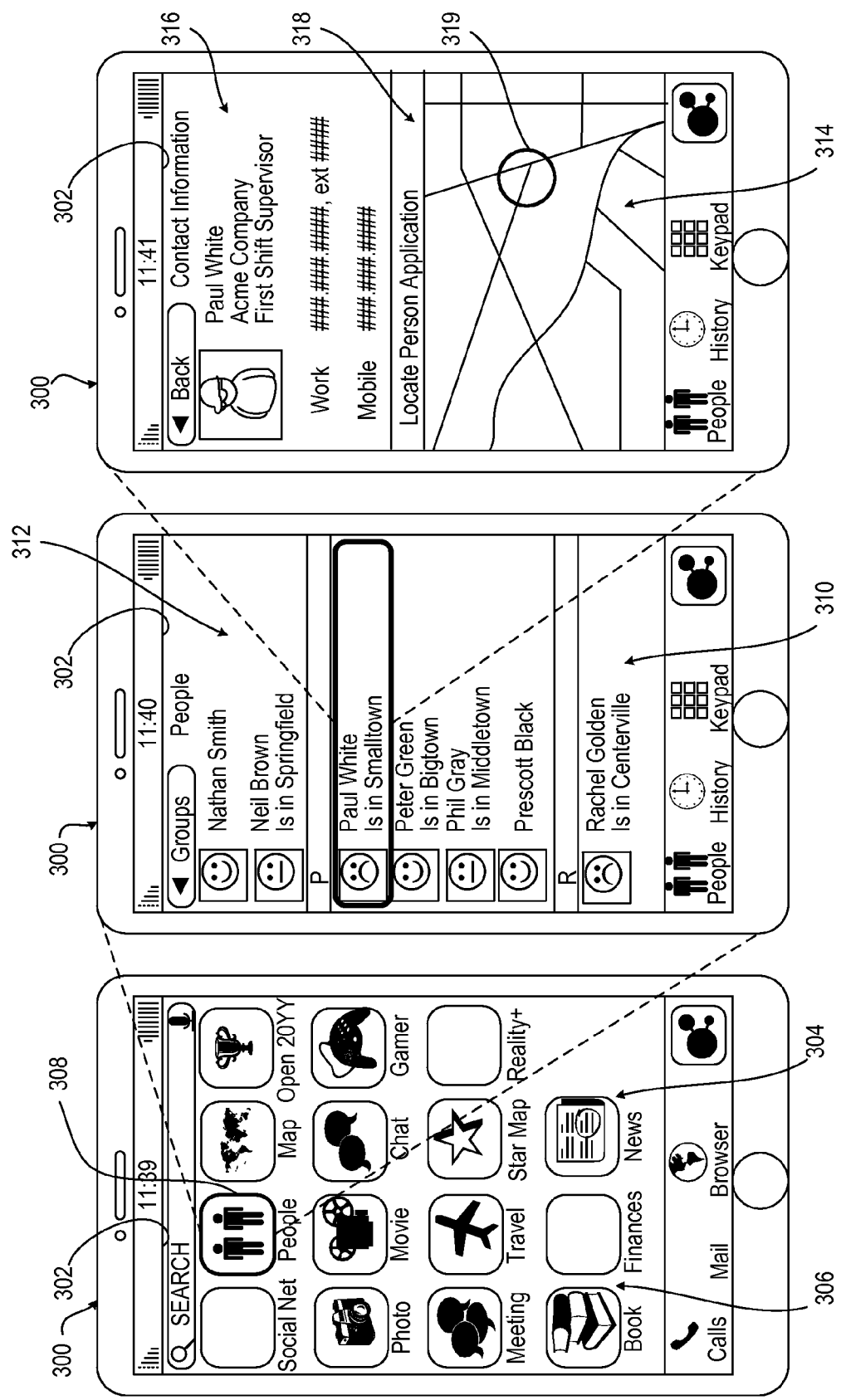
FIG. 3 illustrates sequential depictions of a graphical user interface of a mobile computing platform presenting contextually integrated applications, according to one aspect.

In FIG. 3, a first UI state depicted at 304 presents a home screen populated with a plurality of applications 306, one of which is a People application 308.

As depicted at 310, after selecting the People application 308, the GUI 302 lists contacts 312. Previously, a related location application (e.g., Locate Person Application) has been integrated that enhances the contacts 312 by presenting a current location if discernible. Upon selecting a particular contact, as depicted at 314, contact details 316 are displayed as well as location details 318. For instance, the Locate Person Application, downloaded from an application store, can provide a map UI within a contact detail user interface for a contact, thereby showing the location of the contact.

In one aspect, the integration of one or more applications can be dynamically performed. Thus, the application services can be easily toggled, added or removed as needed.

Figure 4:
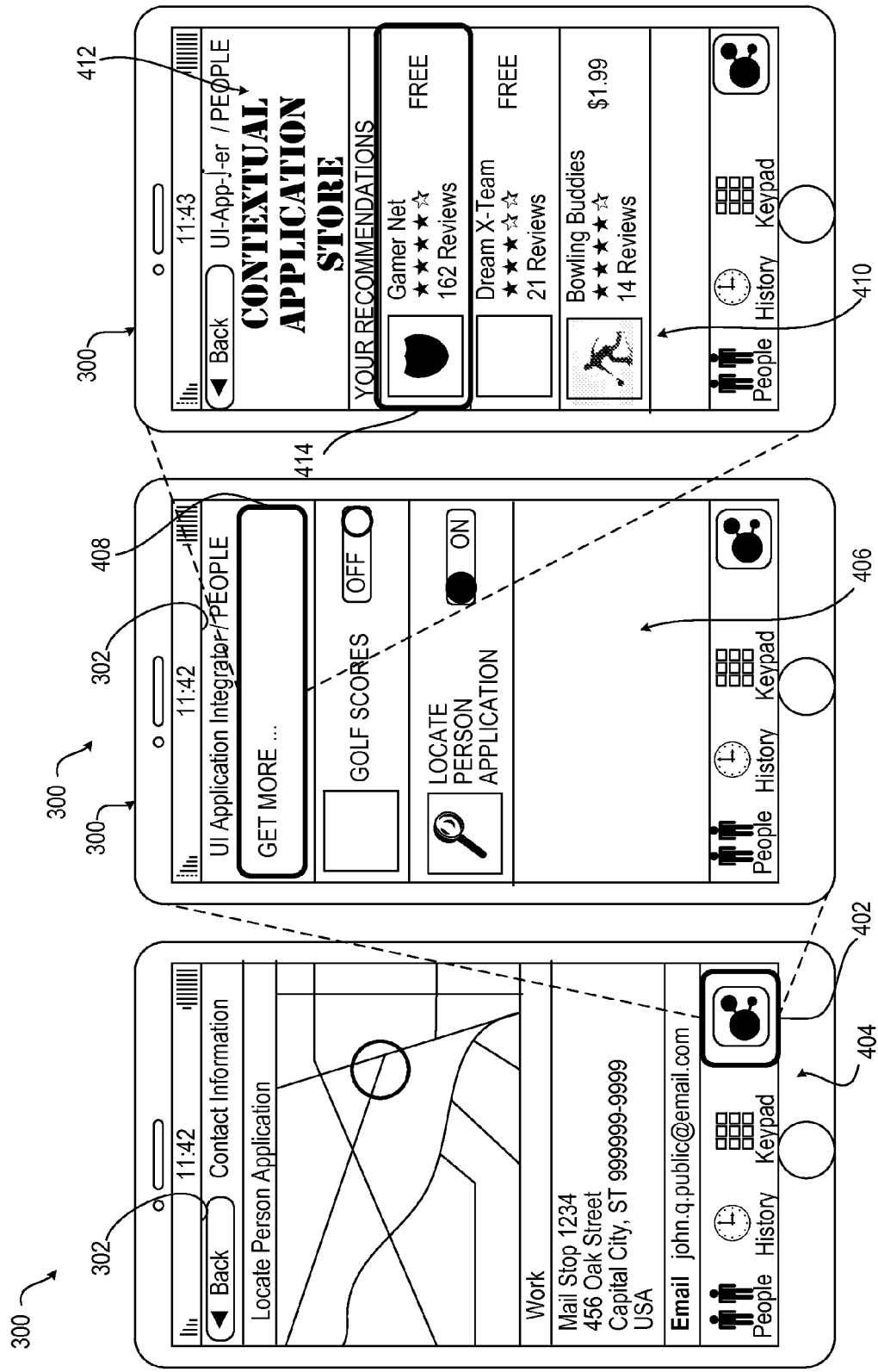
FIG. 4 presents sequential depictions of the graphical user interface presenting contextually related applications that could be installed, according to one aspect.

For instance, as depicted in FIG. 4, a locate person detail user interface 404 may be generated in response to a user selection 319 received at UI 314 (FIG. 3). In an aspect, a UI application integrator icon 402 is accessed from a core application. For example, in this case, UI application integrator icon 402 is located in a lower portion of UI 404. In response to a user selection of UI application integrator icon 402, a user interface is depicted at 406 that provides a listing of currently installed applications that are contextually relevant. As depicted at virtual key 408, the user can select an opportunity to discover one or more additional recommended contextually-related applications 410 from an application store 412. These contextually-related applications 410, like the "Gamer Net" application 414, for example, can have their UI extended into multiple core applications according to the aspects described herein. Each application provides a service that is tailored for a specific purpose, and will affect the relevant core application in its own way.

Figure 5:
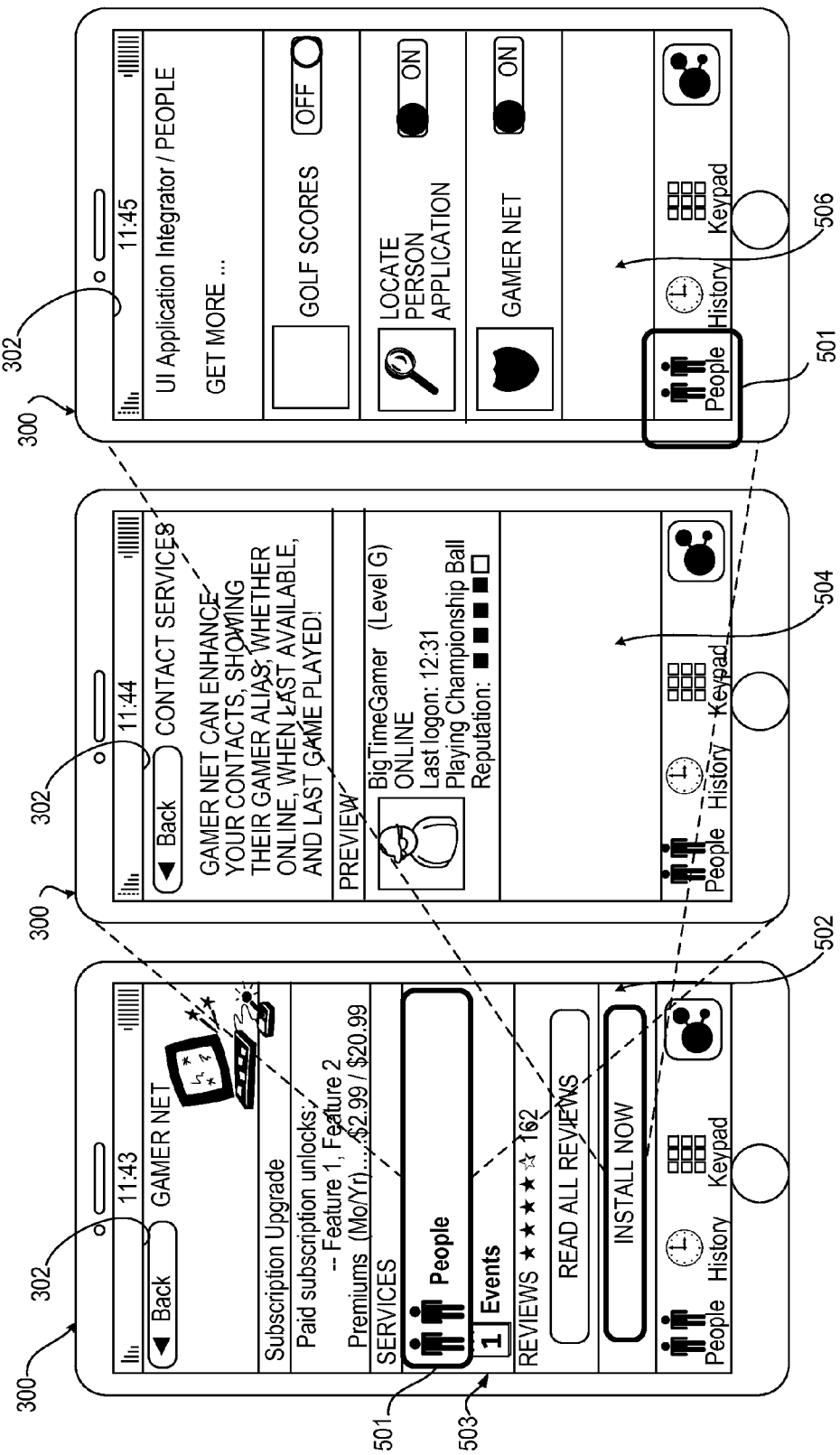
FIG. 5 presents sequential depictions of the graphical user interface presenting operations to review and install the contextually related application, according to one aspect.

For example, in FIG. 5, in response to a user selection of the "Gamer Net" application 414 (FIG. 4), a details user interface 502 is depicted for the Gamer Net application 414, which includes two services provided by Gamer Net application 414 that can be integrated. In this case, the Gamer Net application 414 may extend to both a People application 501 and an Events application 503.

For instance, as depicted at 504, the user selects People application 501 to see how the services of the Gamer Net application 414 can enhance the People application 501. As depicted at 504, examples are presented for how the Gamer Net application 414 would enhance information for the People Application 501. Going back to UI 502, the user may select to add the Gamer Net application 414 to the collection of applications or services resident on the user device, which results in the installed collection of applications or services as depicted at UI 506 including the Gamer Net application 414. Once installed, new applications or services appear in the relevant core applications tabs. In an aspect, for example, a Contacts application on the user device may list Contacts with Gamer Net accounts and display gamer profiles within, for example, a contact details screen. For example, in this case contacts may be stored in People application 501, and the Gamer Net application 414 or service will affect the entry for the contact in the People application 501. The user can then select the contextually related People application 501 to see the integration in operation.

Figure 6:
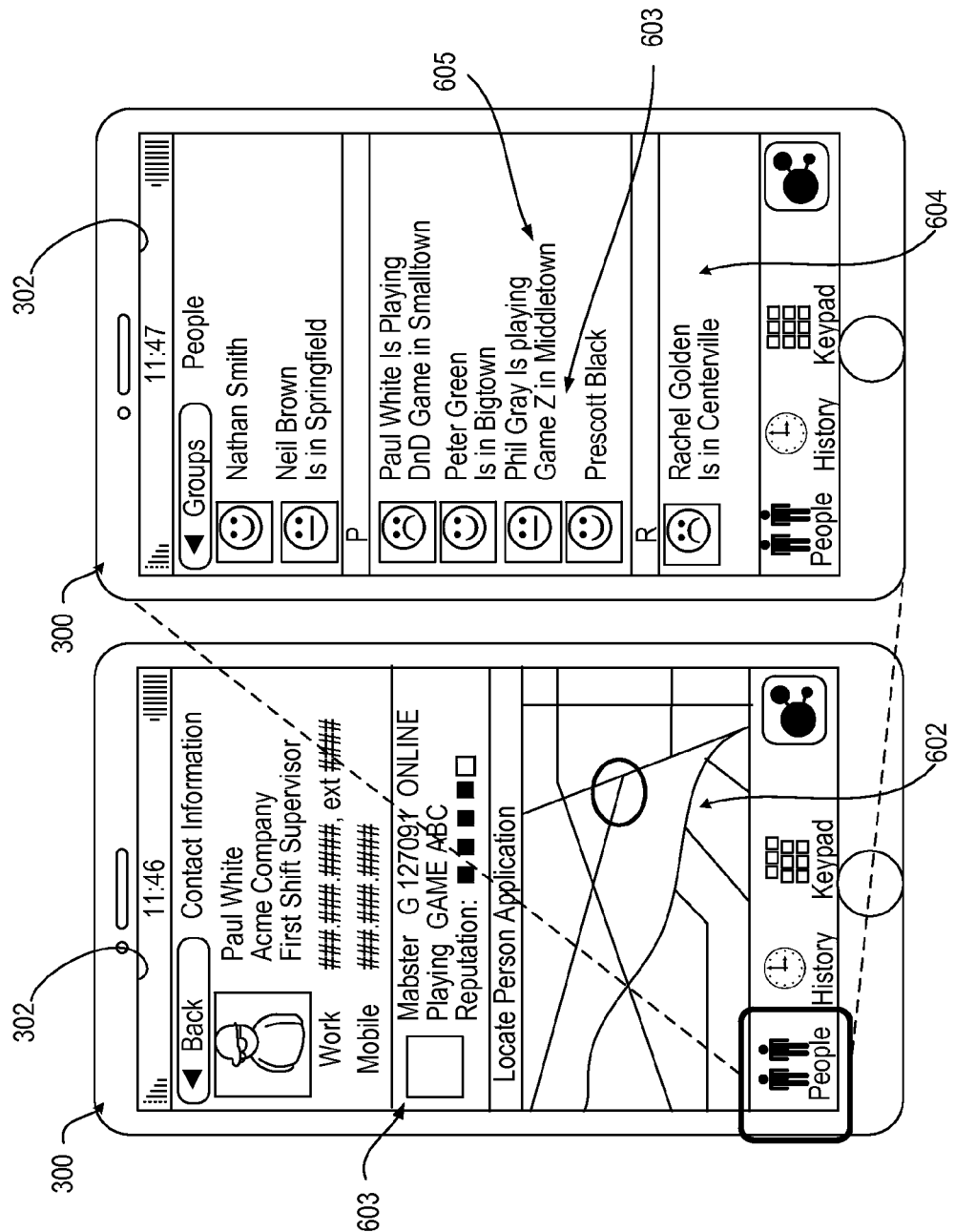
FIG. 6 presents sequential depictions of the graphical user interface after installing the contextually related application, according to one aspect.

For example, in FIG. 6, as depicted at 602 the enhanced People application is shown for the previously selected contact that now shows a status 603 for the individual on Gamer Net. Selecting the People application 501 again backs out to a contact list UI, as depicted at 604, with gamer status 603 now annotated in addition to location 605.

In one aspect, how a service affects core applications can be determined by third party application developers, using flexibility inherent in the UI application integrator Application Programming Interface (API).

Figure 7:
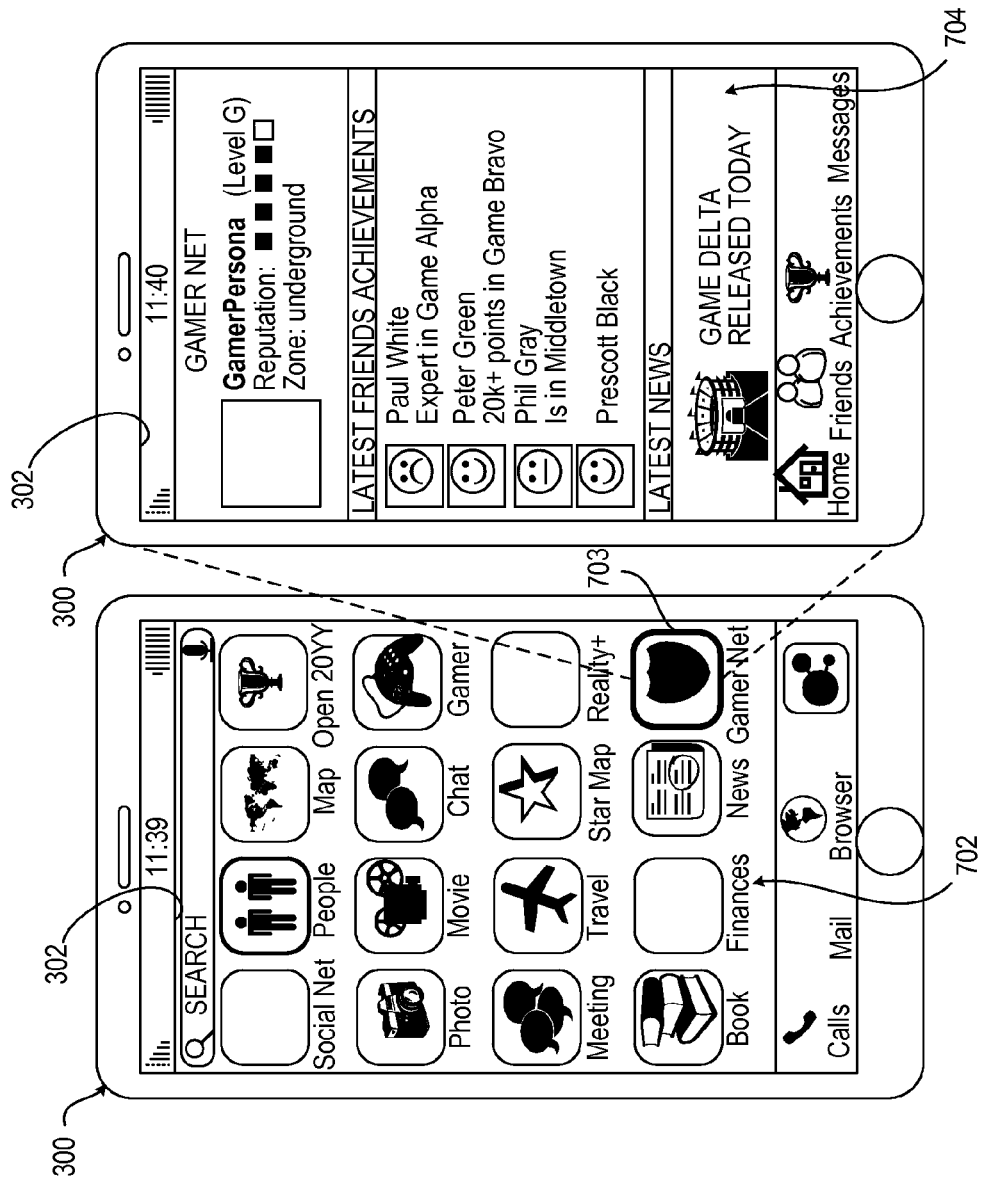
FIG. 7 presents sequential depictions of the graphical user interface of interacting with the newly installed application in a standalone manner, according to one aspect.

In FIG. 7, the collection of services as depicted at 702 shows the Gamer Net icon 703. Since Gamer Net is also a standalone application, Gamer Net is also accessible from the home screen. When selected for standalone operation as depicted at 704, additional services provided by Gamer Net are presented.

Figure 8:
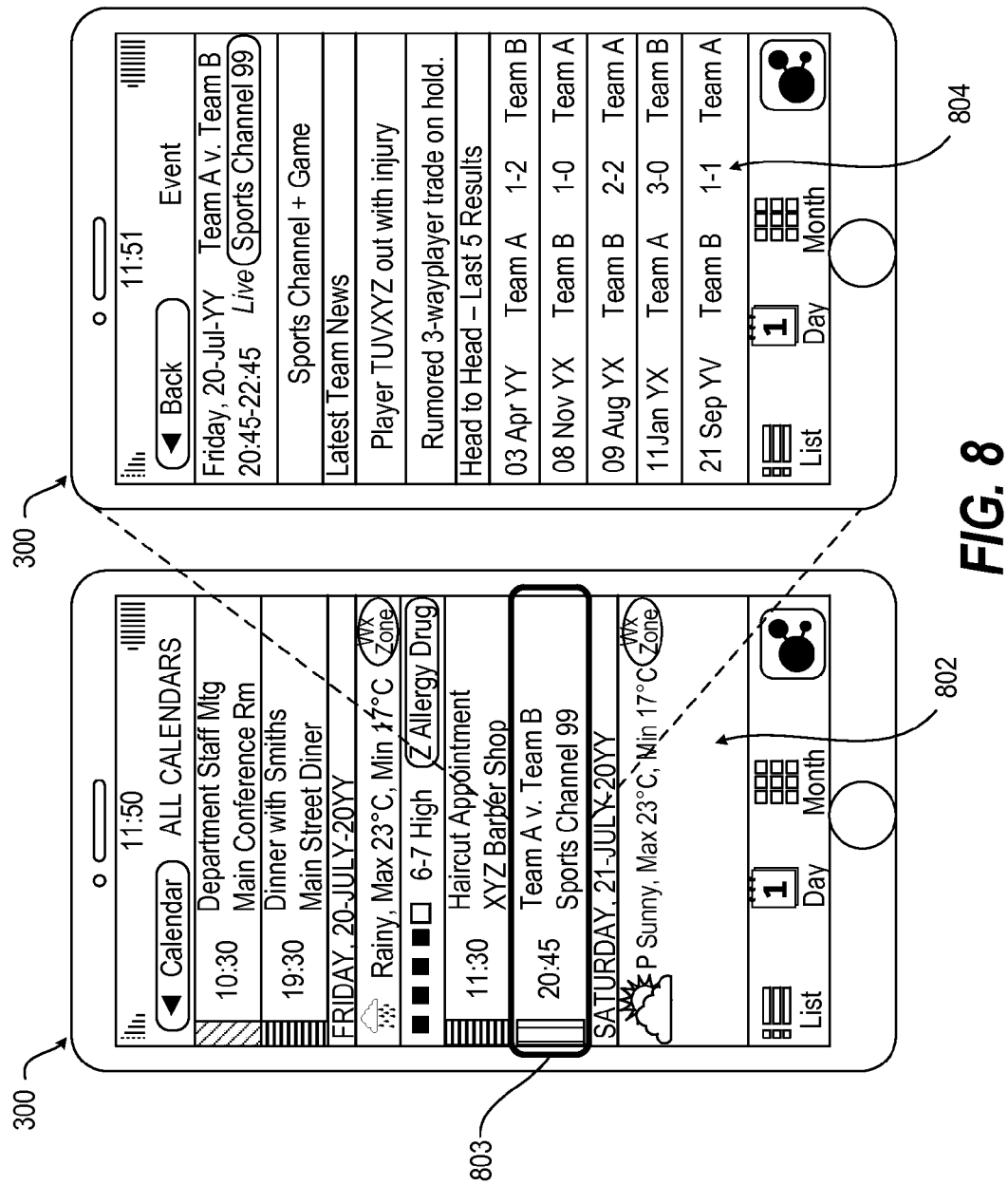
FIG. 8 presents sequential depictions of the graphical user interface of interacting with a calendar application enhanced by integrated application services, according to one aspect.

With initial reference to FIG. 8, some additional examples of how these services can be incorporated into the core applications are depicted. In the calendar application as depicted at 802, services from third party applications can change the core UI to add customized content directly into a calendar view, such as the Week view. For example, a calendar event 803 has a UI which has been enhanced by a Sports application. When the calendar event 803 is selected, an example of the functionality of this integrated service is depicted at 804, wherein additional information has been presented.

Figure 9:
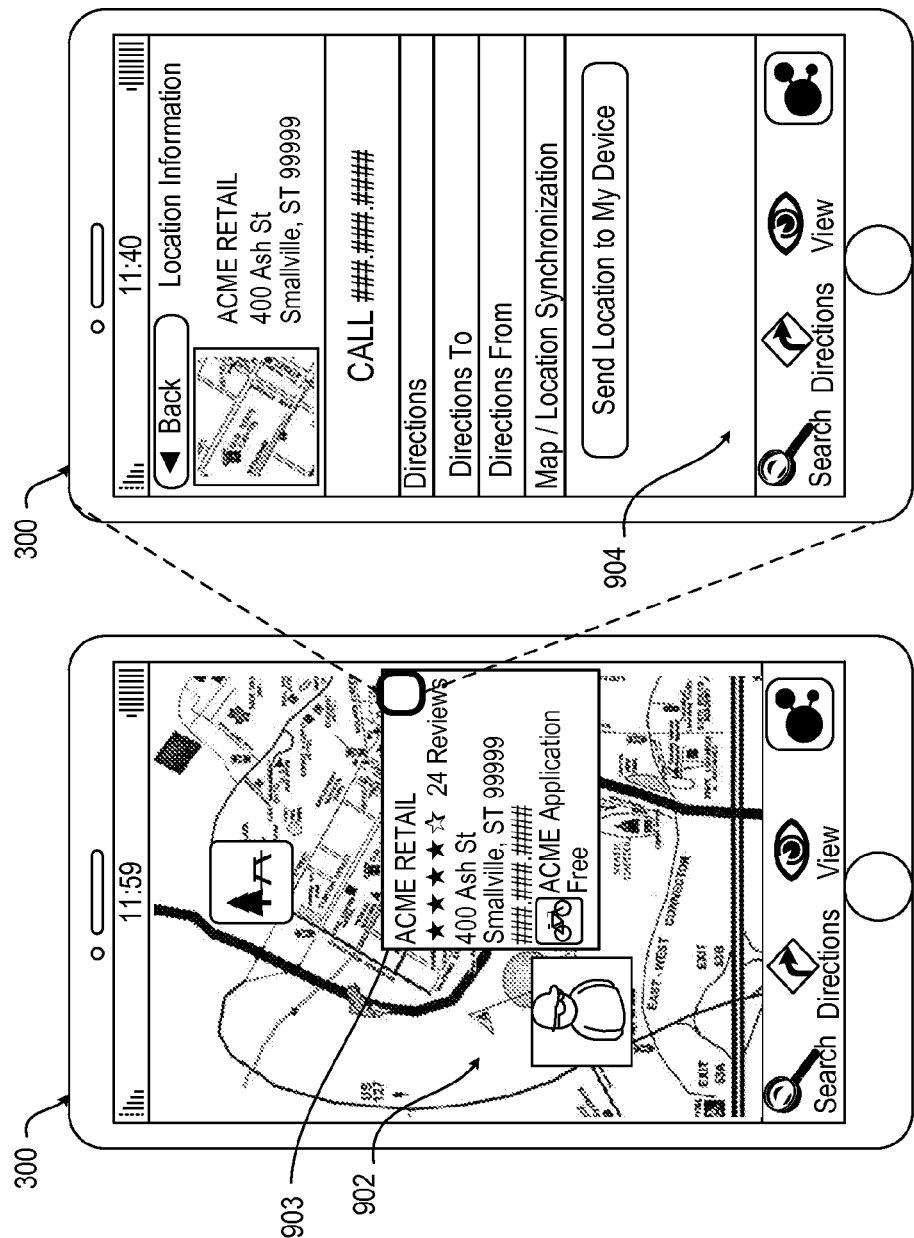
FIG. 9 presents sequential depictions of the graphical user interface of interacting with a location application enhanced by integrated application services, according to one aspect.

In an additional example, referring to FIG. 9, at 902 in a Maps application, UI layers, e.g. layer 903, can be added to show additional information as needed. When a layer is selected, such as the selection of layer 903 resulting in UI 904, one or more integrated services from another UI application, depicted as a Maps Location Synchronization service at 904, may then be available. In this case, for example, Maps Location Synchronization service at 904 enables locations or directions to be sent directly to the user device.

Figure 10:
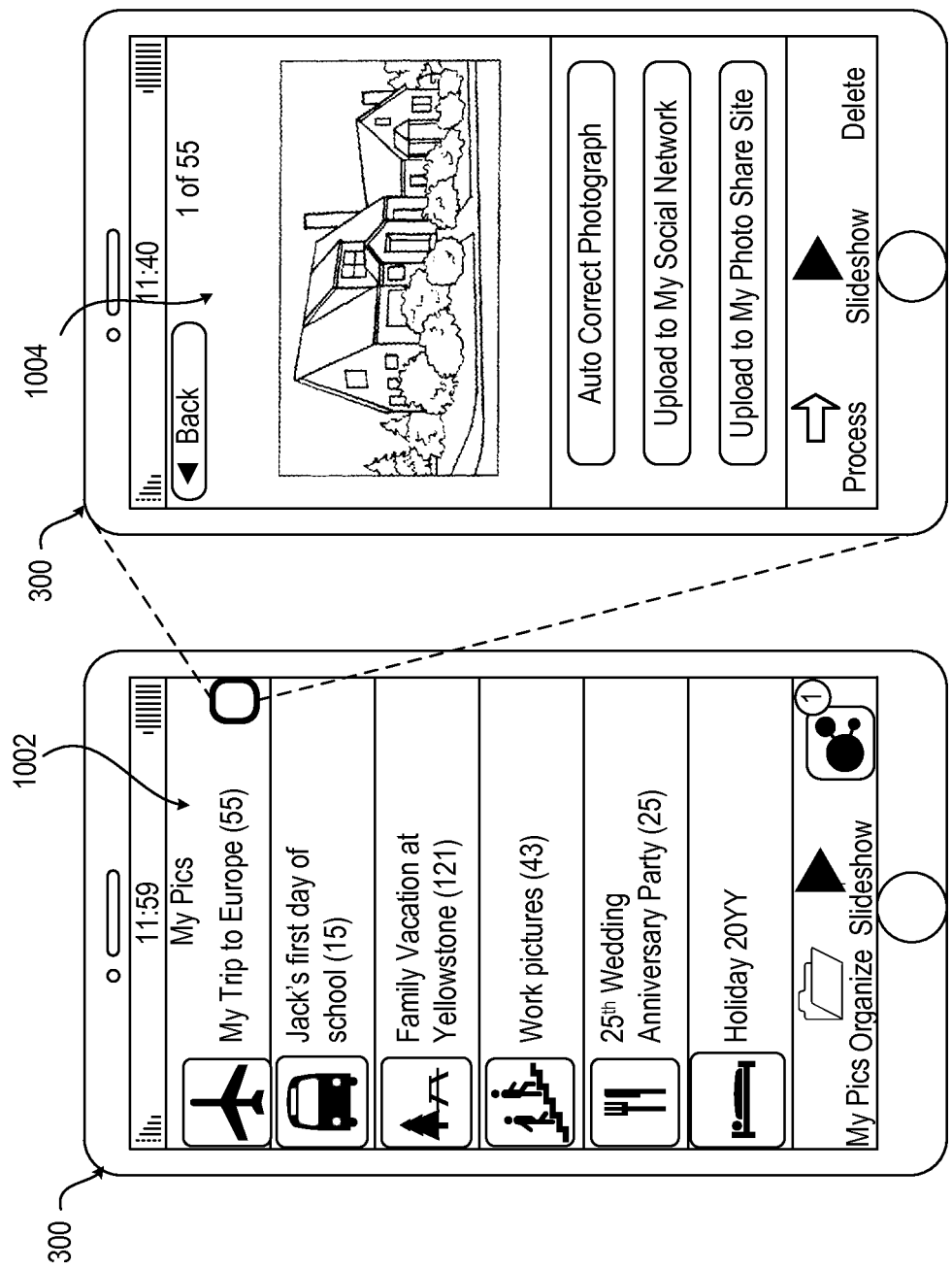
FIG. 10 presents sequential depictions of the graphical user interface of interacting with a photograph application enhanced by integrated application services, according to one aspect.

As a further example in FIG. 10, the present disclosure can be incorporated into a Photos application as depicted at 1002 that provides a catalog of user photographs. When selecting a photograph as depicted at 1004, one or more integrated services from other compatible applications are displayed. For example, in this case, the integrated services may include a process service that allows photos to be processed directly from within the core photo application without having to launch a separate application. Further, for example, the integrated services from other compatible applications may include an auto correct photograph service and a social site and/or photo share site upload service.

Figures 11A, 11B:
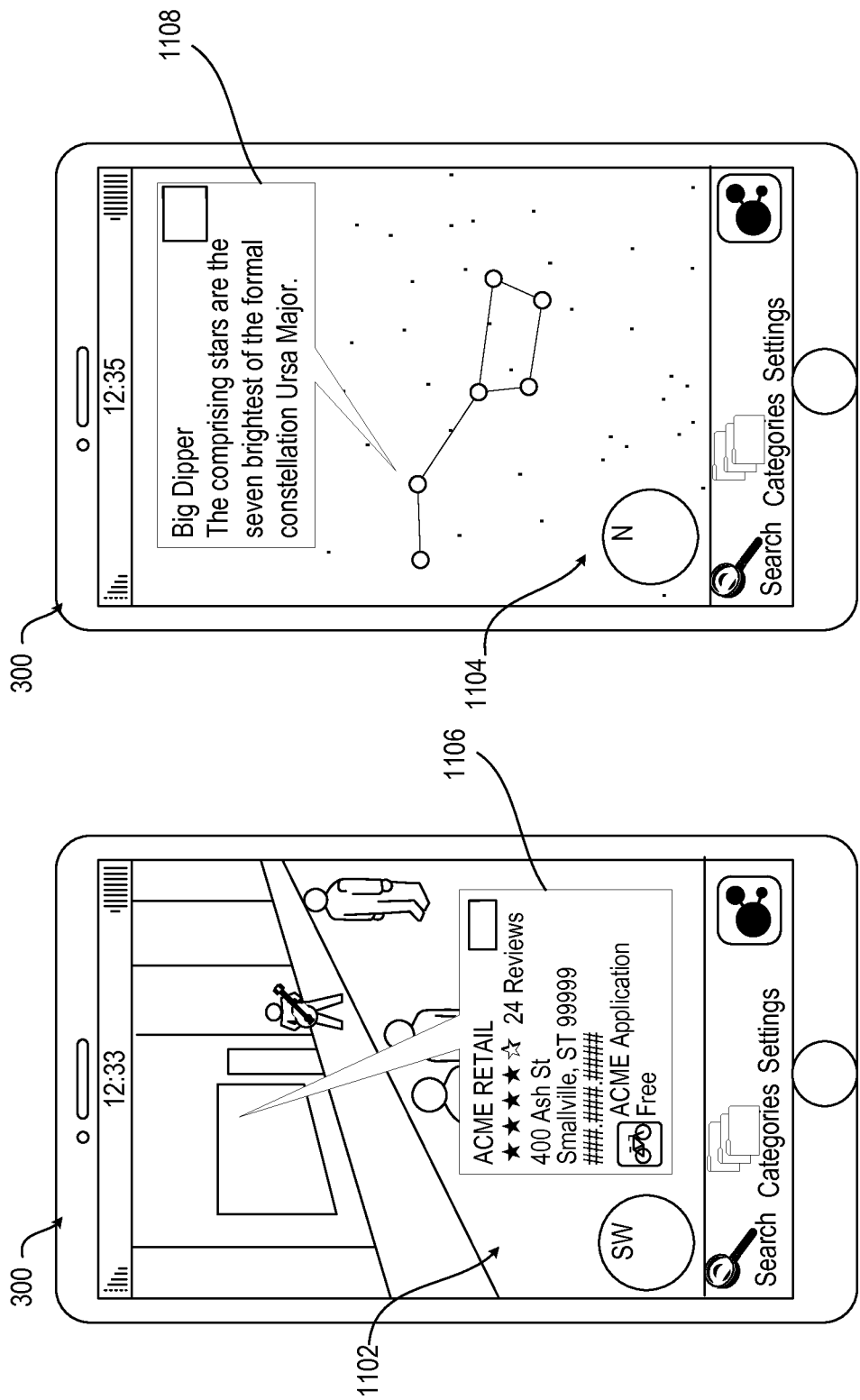
FIGS. 11A-11B present examples of an augmented reality application, according to one aspect.

In FIGS. 11A-11B, an Augmented Reality Application is depicted at 1102 and at 1104 wherein UI layers, such as layers 1106 and 1108, can be added in a similar way to provide extra functionality to a real world depiction, such as a street view for shopping at 1102 and a sky view of a star constellation mapping service at 1104.

Figure 12:
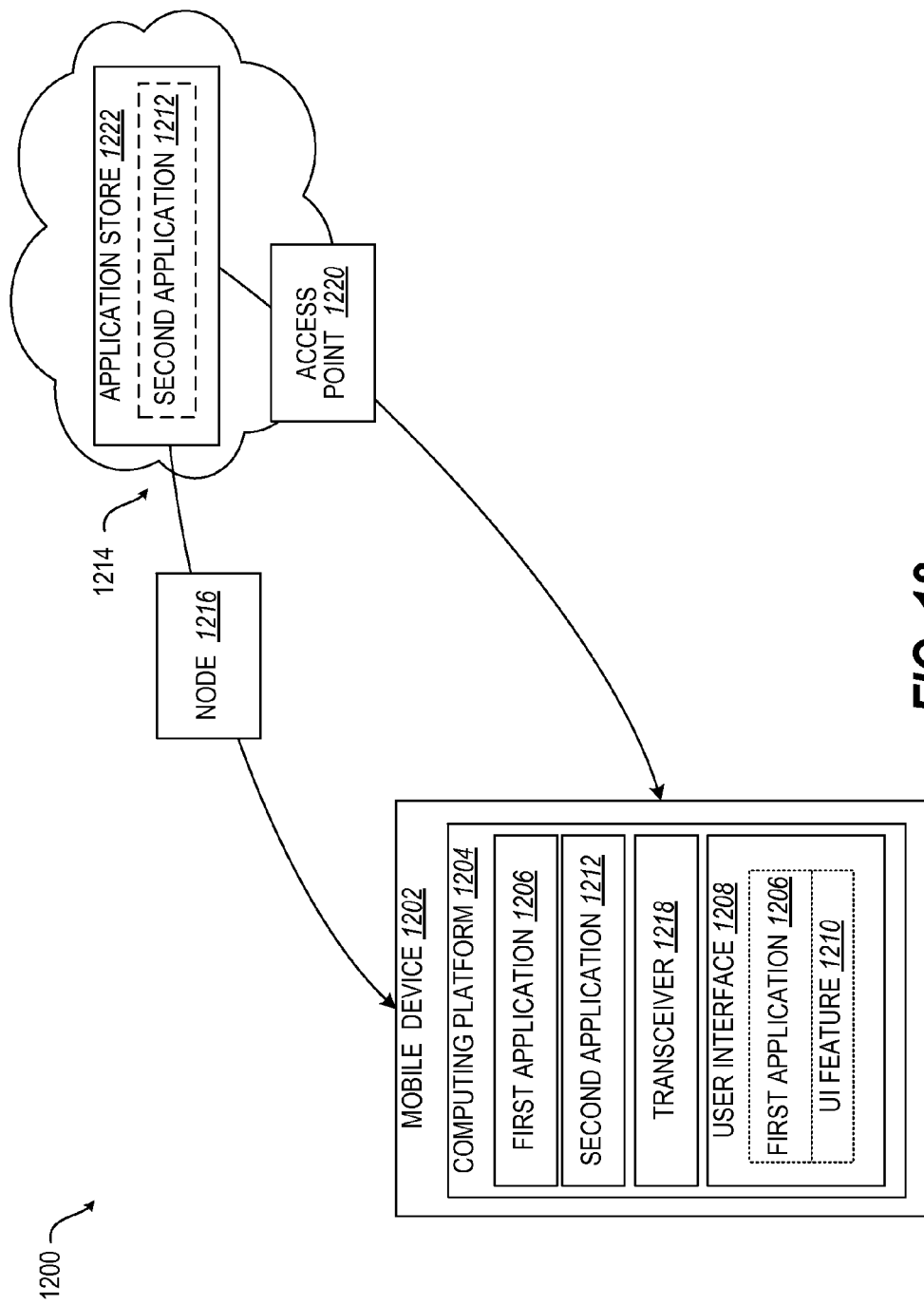
FIG. 12 illustrates a communication system for user interface application contextual integration on a mobile computing platform, according to one aspect.

In FIG. 12, in one aspect, a communication system 1200 is provided wherein an apparatus, depicted as mobile device 1202 such as handset, user equipment, smartphone, access terminal, user device, etc., provides integrated services on a mobile computing platform 1204. In particular, the mobile computing platform 1204 executes a first application 1206 on a user interface (UI) 1208. The user interface 1208 displays a user interface feature 1210 of a second application 1212 in response to the mobile computing platform 1204 determining a contextual similarity with the first application 1206.

In one aspect, the second application 1212 is locally stored on the mobile device 1202. In another aspect, the second application 1212 is remotely stored on a core network 1214 and is downloaded via a wireless wide area network (WWAN) via a node 1216 to a transceiver 1218 of the mobile device 1202. Alternatively or in addition, the second application 1212 is downloaded via a wireless local access network (WLAN) via an access point 1220.

In an exemplary aspect, the user interface is designed to promote third party application discovery in a context that is useful to the user (e.g., related to the task or application the user is currently using and which functionality and/or services the user wishes to acquire to extend the capability of the application currently in use). Accordingly, in one or more implementations, the described aspects provide a framework that allows application developers to extend the UI for the application developer's own application into a core application of a mobile device.

The present disclosure further allows deep integration of application functionality and/or services across the entire mobile UI, making an application store 1222 more of an end point than a start point for the discovery of new application or services (e.g., messaging, events, contacts, maps, browsers, photos, etc.). With the present disclosure, third party applications can extend their UI into core applications on the device, presenting functionality contextually in a respective core application where it is needed. These UI extensions can be referred to as services.

In one aspect, for one or more applications on the device, such as but not limited to a core application, a direct access point may be provided into the application store which only lists applications that have services related, e.g. having a matching compatibility, to the respective application.

In another aspect, an application details screen can identify an application on the device with which one or more other applications can be integrated. In addition, controls can be provided that allow the user to select one of the functionalities or services listed for the other applications to see more details about this integration. For example, a depiction can be presented of how a respective other application integrates with the resident application, which may include a preview image alongside of this depiction.

Figure 13:
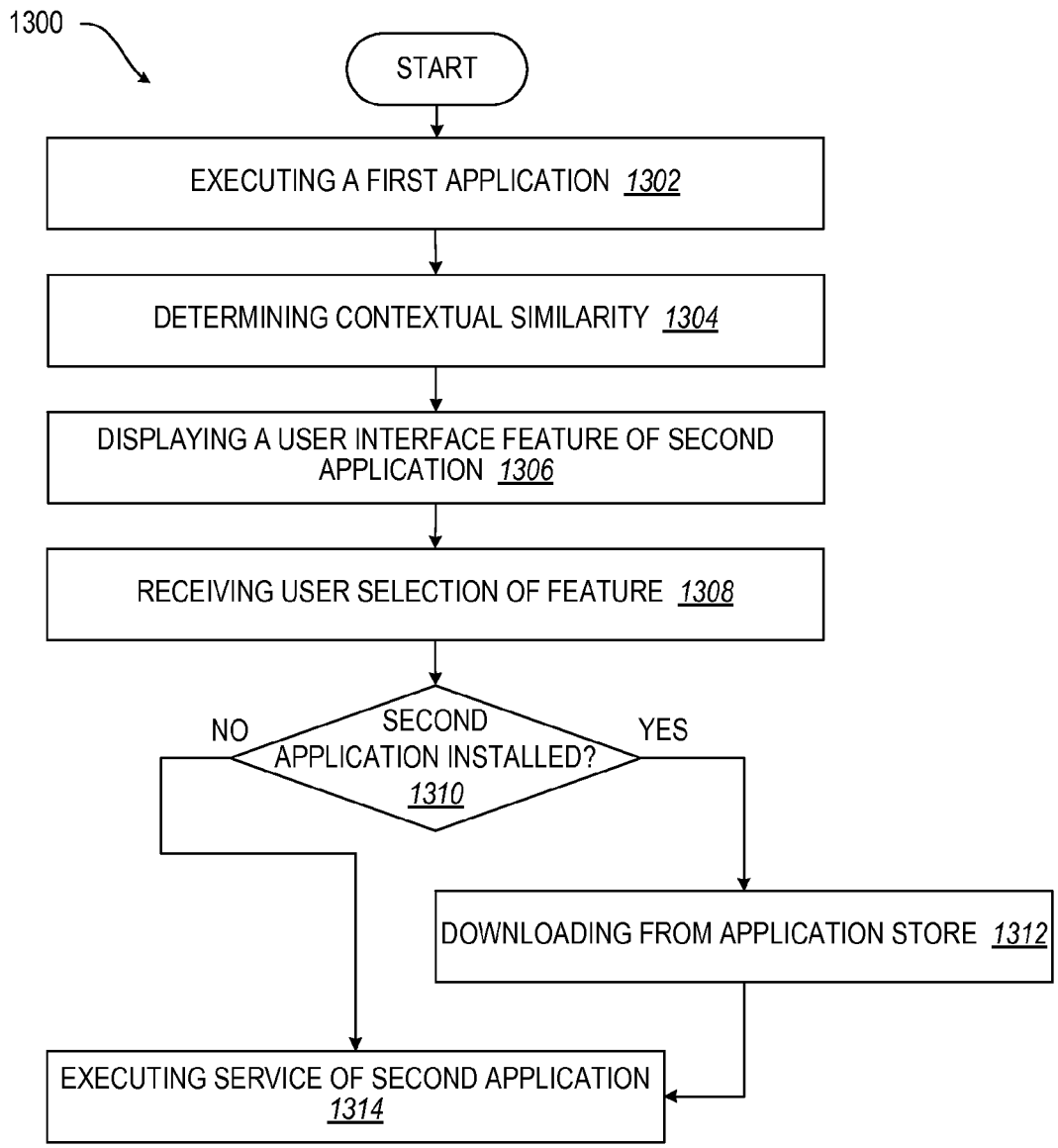
FIG. 13 illustrates a flow diagram of a methodology for contextual integration of applications on a mobile computing platform, according to one aspect.

In FIG. 13, a methodology 1300 is depicted for integrating services on a mobile platform. A mobile device executes a first application on a mobile computing platform (block 1302). The mobile device determines a contextual similarity of the first application to a second application, or a service provided by a second application (block 1304). The mobile device displays a user interface feature of a second application in response to the determined contextual similarity with the first application (block 1306). The mobile device receives a user selection of the user interface feature (block 1308). A determination is made whether the second application is installed (block 1310). If not, the second application is downloaded from an application store (e.g., via WWAN or WLAN) (block 1312) and then the service of the second application referenced by a defined extension ("service") may be executed (block 1314). If so, the service of the second application referenced by a defined extension ("service") is executed (block 1314).

Figure 14:
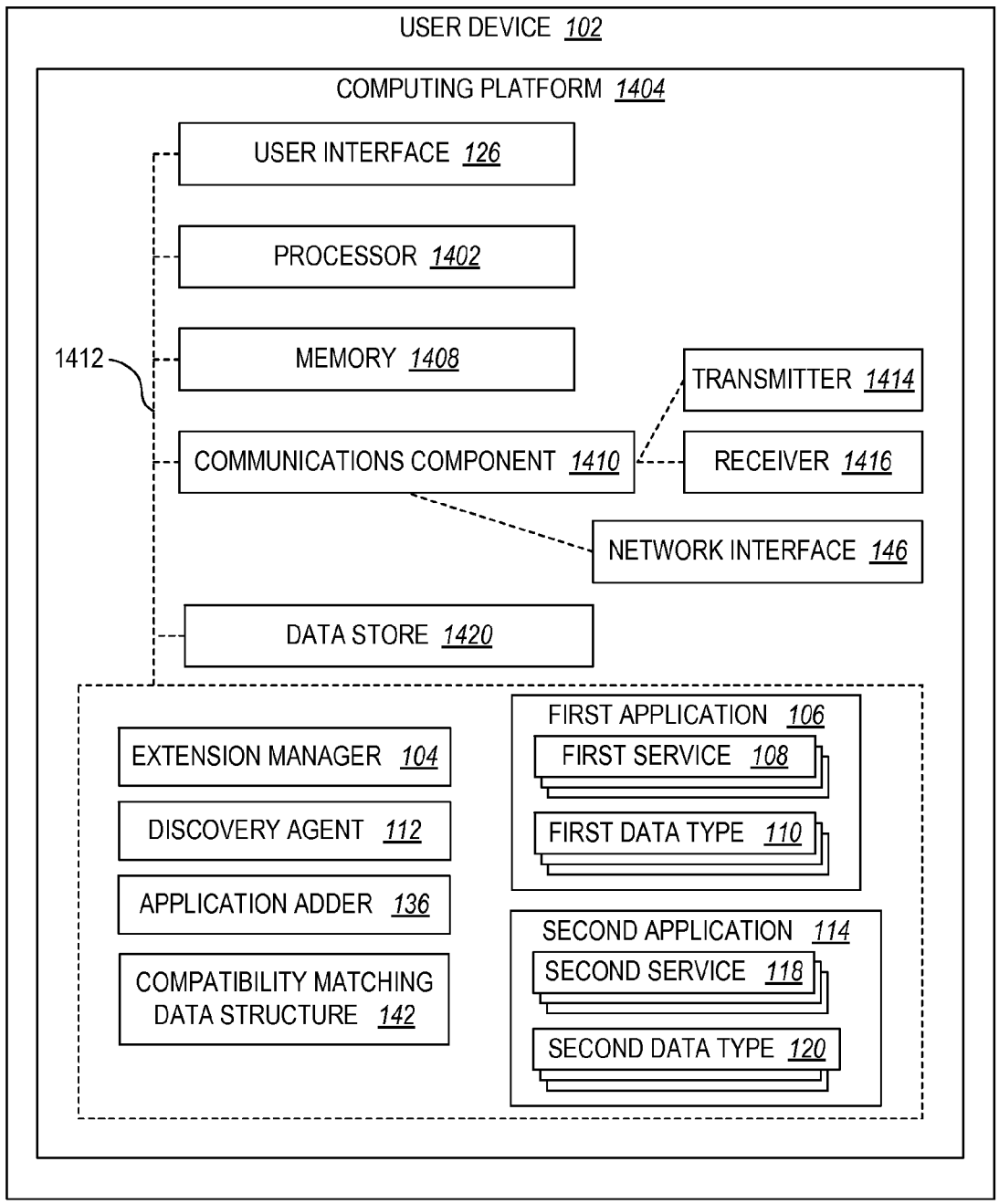
FIG. 14 illustrates a schematic diagram of an exemplary environment of a user device for extending application services, according to one aspect.

Referring to FIG. 14, in one aspect, the user device 102 (FIG. 1) may include a processor 1402 for carrying out processing functions associated with one or more of components and functions described herein. Processor 1402 can include a single or multiple set of processors or multi-core processors as part. Moreover, processor 1402 can be implemented as an integrated processing system and/or a distributed processing system, depicted as a computing platform 1404.

User device 102 further includes a memory 1408, such as for storing local versions of applications being executed by processor 1402. Memory 1408 can include any type of memory usable by a computer, such as random access memory (RAM), read only memory (ROM), tapes, magnetic discs, optical discs, volatile memory, non-volatile memory, and any combination thereof.

Further, user device 102 includes a communications component 1410 that provides for establishing and maintaining communications with one or more parties utilizing hardware, software, and services as described herein. Communications component 1410 may carry communications between components on user device 102, as well as between user device 102 and external devices, such as devices located across a communications network and/or devices serially or locally connected to user device 102. For example, communications component 1410 may include one or more buses 1412, and may further include transmit chain components and receive chain components associated with a transmitter 1414 and a receiver 1416, respectively, operable for interfacing with external devices. In another example, communications component 1410 may communicate with external devices via a network interface 146.

Additionally, user device 102 may further include a data store 1420, which can be hardware and/or software, and which provides for mass storage of information, databases, and programs employed in connection with aspects described herein. For example, data store 1420 may be a data repository for applications not currently being executed by processor 1402.

User device 102 may additionally include a user interface 126 operable to receive inputs from a user of user device 102 and further operable to generate outputs for presentation to the user. User interface 126 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface 126 may include one or more output devices, including but not limited to a display, a speaker, a haptic feedback mechanism, a printer, any other mechanism capable of presenting an output to a user, or any combination thereof.

Resident in memory 1408, data store 1420 or both, aspects of the apparatus 102 can incorporate the extension manager 104, discovery agent 112, application adder 136, data structure 142, the first application 106 having the first service 108 and the first data type 110, and the second application 114 having the second service 118 and the second data type 120.

Figure 15:
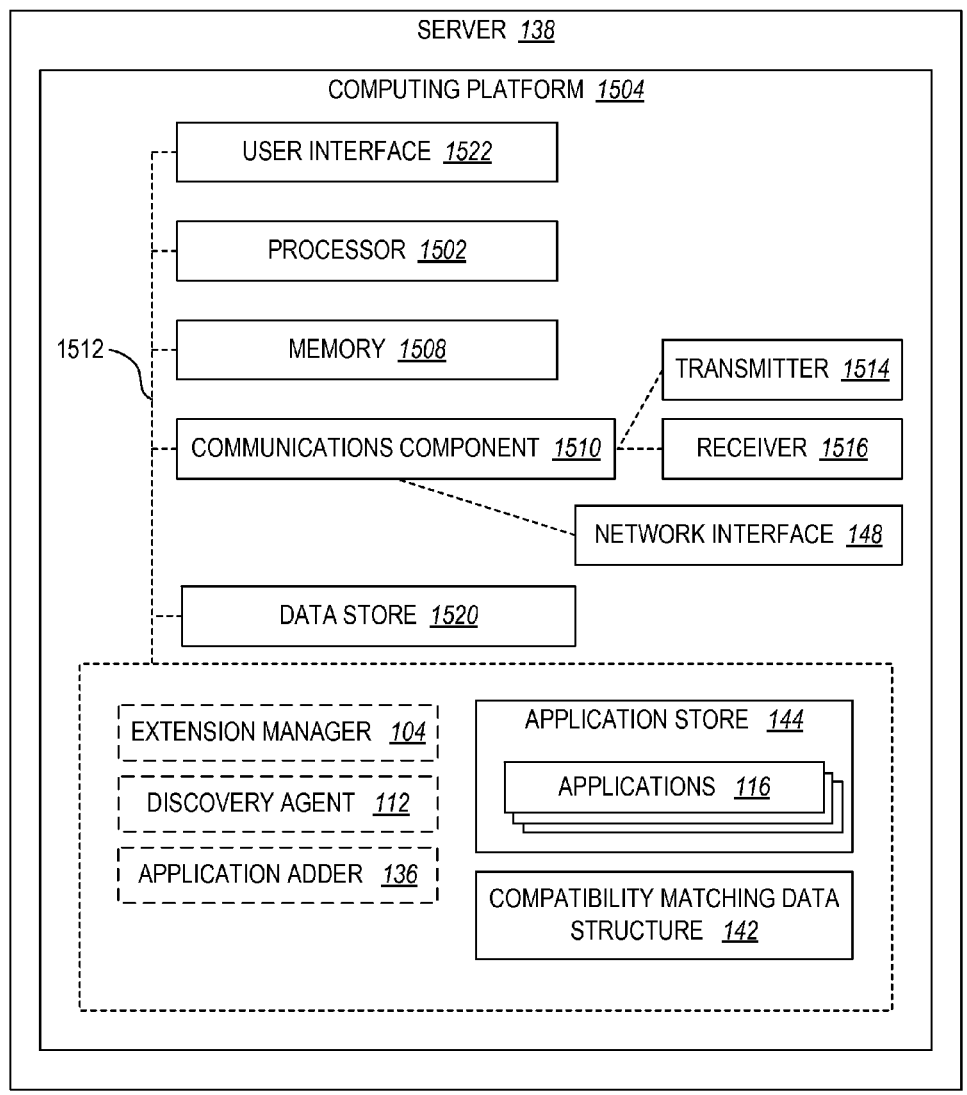
FIG. 15 illustrates a schematic diagram of an exemplary environment of a network entity for extending application services, according to one aspect.

Referring to FIG. 15, in one aspect, the server 138 (FIG. 1) may include a processor 1502 for carrying out processing functions associated with one or more of components and functions described herein. Processor 1502 can include a single or multiple set of processors or multi-core processors. Moreover, processor 1502 can be implemented as an integrated processing system and/or a distributed processing system, depicted as a computing platform 1504. The server 138 can support the user device 102 (FIG. 1) as described above. Alternatively, processing or storage aspects can be distributed between the server 138 and the user device 102, such as having the server 138 perform additional functions for a thin client on a user device 102.

Server 138 further includes a memory 1508, such as for storing local versions of applications being executed by processor 1502. Memory 1508 can include any type of memory usable by a computer, such as random access memory (RAM), read only memory (ROM), tapes, magnetic discs, optical discs, volatile memory, non-volatile memory, and any combination thereof.

Further, server 138 includes a communications component 1510 that provides for establishing and maintaining communications with one or more parties utilizing hardware, software, and services as described herein. Communications component 1510 may carry communications between components on server 138, as well as between server 138 and external devices, such as user devices 102 located across a communications network and/or devices serially or locally connected to server 138. For example, communications component 1510 may include one or more buses 1512, and may further include transmit chain components and receive chain components associated with a transmitter 1514 and a receiver 1516, respectively, operable for interfacing with external devices. For another example, communications component 1510 may communicate to external devices via a network interface 148.

Additionally, server 138 may further include a data store 1520, which can be any suitable combination of hardware and/or software, that provides for mass storage of information, databases, and programs employed in connection with aspects described herein. For example, data store 1520 may be a data repository for applications not currently being executed by processor 1502.

Server 138 may additionally include a user interface 1522 operable to receive inputs from a user of user device 102 (FIG. 1), and further operable to generate outputs for presentation to the user. User interface 1522 may interface with one or more input devices, including but not limited to a keyboard, a number pad, a mouse, a touch-sensitive display, a navigation key, a function key, a microphone, a voice recognition component, any other mechanism capable of remotely receiving an input from a user, or any combination thereof. Further, user interface 1522 may interface with one or more output devices, including but not limited to a display, a speaker, a haptic feedback mechanism, a printer, any other mechanism capable of presenting an output to a user, or any combination thereof.

Resident in memory 1508, data store 1520 or both, aspects of the server 138 can incorporate the extension manager 104, discovery agent 112, and application adder 136, for example for downloading to a user device, such as user device 102 (FIG. 1). Further, memory 1508, data store 1520 or both, may include data structure 142, and an application store 144 containing the plurality of applications 116.

Figure 16:
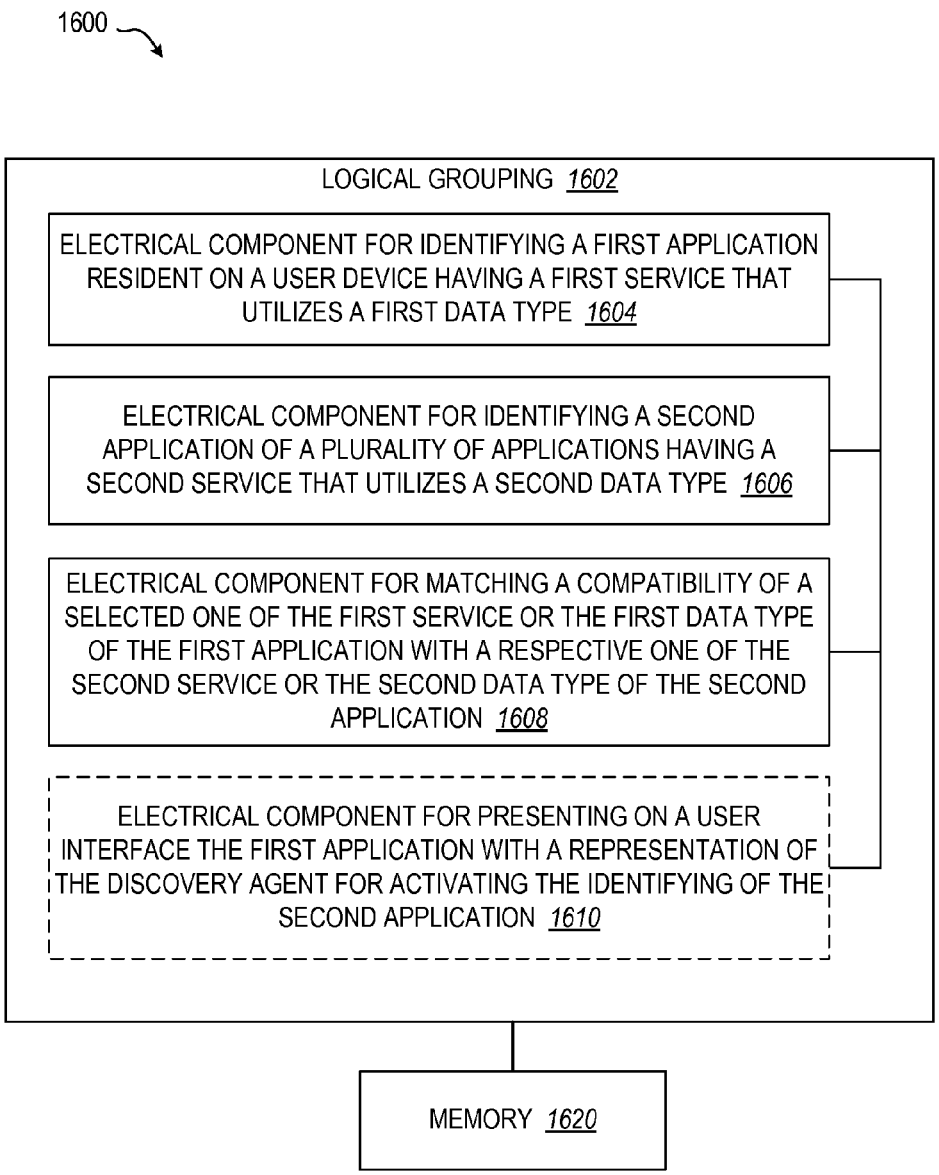
FIG. 16 illustrates a schematic diagram of a logical grouping of electrical components for extending services of a user device, according to one aspect.

With reference to FIG. 16, illustrated is a system 1600 for extending services of a user device. For example, system 1600 can reside at least partially within user equipment. It is to be appreciated that system 1600 is represented as including functional blocks, which can be functional blocks that represent functions implemented by a computing platform, processor, software, or combination thereof (e.g., firmware). System 1600 includes a logical grouping 1602 of electrical components that can act in conjunction. For instance, logical grouping 1602 can include an electrical component 1604 for identifying a first application resident on a user device having a first service that utilizes a first data type. For another instance, logical grouping 1602 can include an electrical component 1606 for identifying a second application of a plurality of applications having a second service that utilizes a second data type. For an additional instance, logical grouping 1602 can include an electrical component 1608 for compatibility matching a selected one of the first service or the first data type of the first application with a respective one of the second service or the second data type of the second application. Optionally, as indicated by dashed lines, logical grouping 1602 can include an electrical component 1610 for presenting on a user interface the first application with a representation of the discovery agent for activating the identifying of the second application. Additionally, system 1600 can include a memory 1620 that retains instructions for executing functions associated with electrical component 1604-1610. While shown as being external to memory 1620, it is to be understood that one or more of electrical component 1604-1610 can exist within memory 1620.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

In addition, the various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Furthermore, the one or more versions may be implemented as a method, apparatus, or article of manufacture using standard programming and/or engineering techniques to produce software, firmware, hardware, or any combination thereof to control a computer to implement the disclosed aspects. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed aspects.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal In the alternative, the processor and the storage medium may reside as discrete components in a user terminal.

The previous description of the disclosed aspects is provided to enable any person skilled in the art to make or use the present disclosure. Various modifications to these aspects will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers. The term article of manufacture, as used herein, is intended to encompass a computer program accessible from any computer-readable device, carrier, or media.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

What is claimed is:

1. A method for extending services of a user device, comprising:

identifying a first application resident on the user device having a first service that utilizes a first data type;

identifying a second application of a plurality of applications having a second service that utilizes a second data type;

matching a compatibility of a selected one of the first service or the first data type of the first application with a respective one of the second service or the second data type of the second application; and presenting, on a user interface, the first application with a representation of a discovery agent for activating the identifying of the second application.

2. The method of claim 1, wherein the first application comprises one of a plurality of services or a plurality of data types, the method further comprising:

presenting, on the user interface, a current context comprising the first service and the first data type, and identifying the second application according to the current context.

3. The method of claim 1, further comprising storing the second application on the user device.

4. The method of claim 3, further comprising presenting, on the user interface, the first application with a representation of an application adder for activating the storing of the second application.

5. The method of claim 1, wherein matching the compatibility further comprises matching the first service of the first application with the second data type of the second application.

6. The method of claim 5, wherein the first service comprises a contact service and the second data type comprises an online gamer contact.

7. The method of claim 5, wherein the first service comprises a contact service and the second data type comprises a location service.

8. The method of claim 1, wherein matching the compatibility further comprises matching the first data type of the first application with the second service of the second application.

9. The method of claim 8, wherein the first data type comprises a media format and the second service comprises a media viewer.

10. The method of claim 8, wherein the first data type comprises a media format and the second service comprises an uploader to a server.

11. The method of claim 8, wherein the first data type comprises an image format associated with at least one location and the second service comprises a service associated with the at least one location.

12. The method of claim 1, further comprising obtaining a data structure that defines the compatibility of one or more of the plurality of applications.

13. The method of claim 12, further comprising accessing the data structure via a network interface.

14. The method of claim 1, further comprising obtaining and integrating the respective one of the second data type or second service of the second application for use by the selected one of the first service or the first data type of the first application in response to a user selection.

15. At least one processor for extending services of a user device, comprising:

a first module for identifying a first application resident on the user device having a first service that utilizes a first data type;

a second module for identifying a second application of a plurality of applications having a second service that utilizes a second data type;

a third module for matching a compatibility of a selected one of the first service or the first data type of the first application with a respective one of the second service or the second data type of the second application; and a fourth module for presenting, on a user interface, the first application with a representation of a discovery agent for activating the second module for identifying of the second application.

16. A computer program product for extending services of a user device, comprising:

a non-transitory computer-readable storage medium for storing instructions comprising:

at least one instruction for causing a computer to identify a first application resident on the user device having a first service that utilizes a first data type;

at least one instruction for causing the computer to identify a second application of a plurality of applications having a second service that utilizes a second data type;

at least one instruction for causing the computer to match a compatibility of a selected one of the first service or the first data type of the first application with a respective one of the second service or the second data type of the second application; and at least one instruction for causing the computer to present, on a user interface, the first application with a representation of a discovery agent for activating the at least one instruction to identify of the second application.

17. An apparatus for extending services of a user device, comprising:

means for identifying a first application resident on the user device having a first service that utilizes a first data type;

means for identifying a second application of a plurality of applications having a second service that utilizes a second data type;

means for compatibility matching a selected one of the first service or the first data type of the first application with a respective one of the second service or the second data type of the second application; and means for presenting, on a user interface, the first application with a representation of a discovery agent for activating the means for identifying of the second application.

18. An apparatus for extending services of a user device, comprising:

a processor;

an extension manager for identifying a first application resident on the user device having a first service that utilizes a first data type;

a discovery agent for identifying a second application of a plurality of applications having a second service that utilizes a second data type, wherein the discovery agent identifies the second application by matching a compatibility of a selected one of the first service or the first data type of the first application with a respective one of the second service or the second data type of the second application; and a user interface for presenting the first application with a representation of the discovery agent for identifying of the second application.

19. The apparatus of claim 18, wherein the first application comprises one of a plurality of services or a plurality of data types, wherein the user interface is further configured for presenting a current context comprising the first service and the first data type, and wherein the discovery agent is further configured for identifying the second application according to the current context.

20. The apparatus of claim 18, further comprising an application adder for storing the second application on the user device.

21. The apparatus of claim 20, wherein the user interface is further configured for presenting the first application with a representation of the application adder for activating the storing of the second application.

22. The apparatus of claim 18, wherein the discovery agent is further configured for matching the compatibility of the first service of the first application with the second data type of the second application.

23. The apparatus of claim 22, wherein the first service comprises a contact service and the second data type comprises an online gamer contact.

24. The apparatus of claim 22, wherein the first service comprises a contact service and the second data type comprises a location service.

25. The apparatus of claim 18, wherein the discovery agent is further configured for matching the compatibility of the first data type of the first application with the second service of the second application.

26. The apparatus of claim 25, wherein the first data type comprises a media format and the second service comprises a media viewer.

27. The apparatus of claim 25, wherein the first data type comprises a media format and the second service comprises an uploader to a server.

28. The apparatus of claim 25, wherein the first data type comprises an image format associated with at least one location and the second service comprises a service associated with the at least one location.

29. The apparatus of claim 18, further comprising a data structure that defines the compatibility of the plurality of applications, wherein the discovery agent accesses the data structure for the matching of the compatibility of the first application to the second application.

30. The apparatus of claim 29, further comprising a network interface for accessing the data structure.

31. The apparatus of claim 18, wherein the extension manager is further configured for obtaining and integrating the respective one of the second data type or second service of the second application for use by the selected one of the first service or the first data type of the first application in response to a user selection.

* * * * *